No. 719,226. PATENTED JAN. 27, 1903.
J. JOHNSON.
FISH CLEANING APPARATUS.
APPLICATION FILED MAY 13, 1901.

NO MODEL. 5 SHEETS—SHEET 1.

Witnesses,

Inventor,
John Johnson

No. 719,226. PATENTED JAN. 27, 1903.
J. JOHNSON.
FISH CLEANING APPARATUS.
APPLICATION FILED MAY 13, 1901.
NO MODEL.
5 SHEETS—SHEET 2.
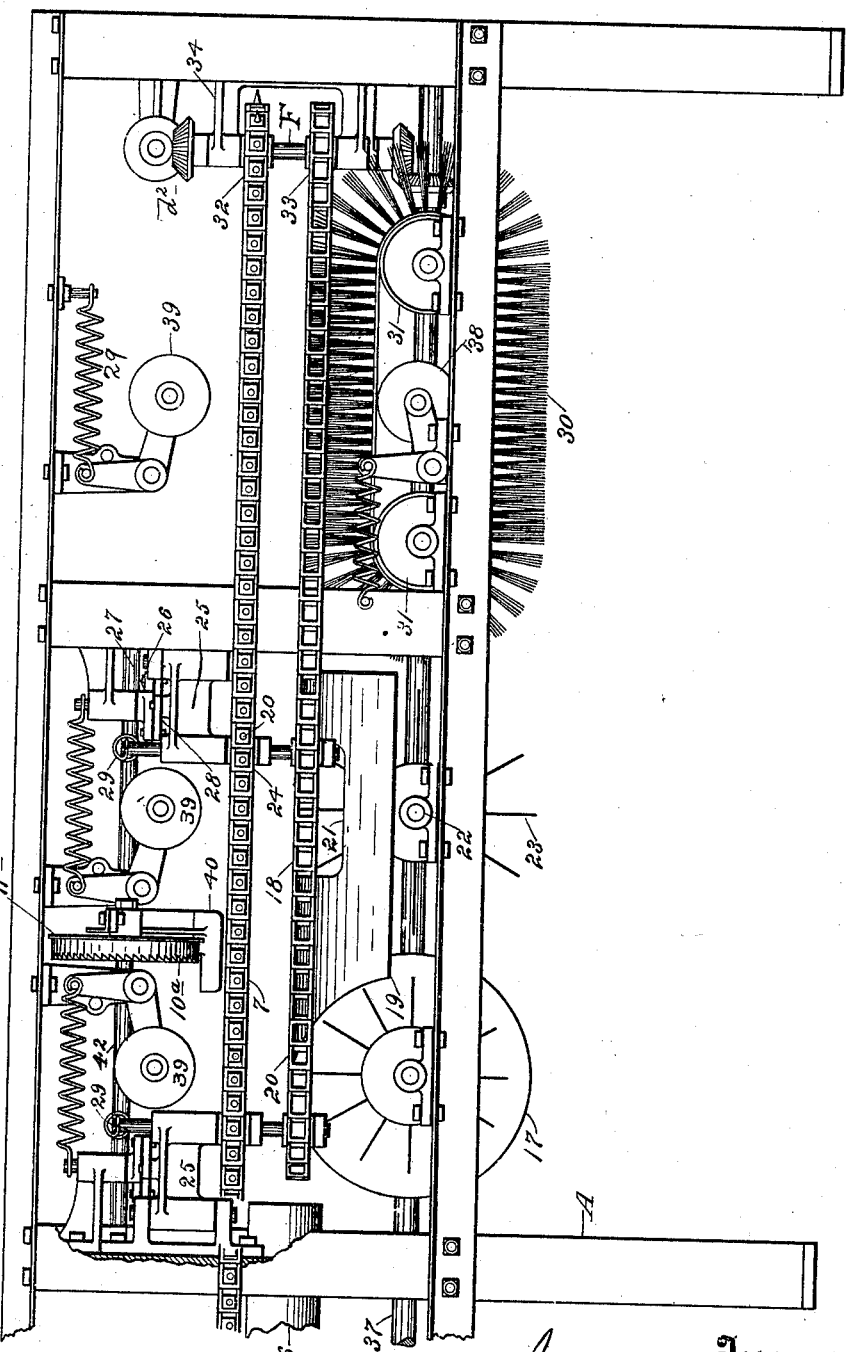
Witnesses,
Inventor,
John Johnson

No. 719,226. PATENTED JAN. 27, 1903.
J. JOHNSON.
FISH CLEANING APPARATUS.
APPLICATION FILED MAY 13, 1901.
NO MODEL. 5 SHEETS—SHEET 3.

No. 719,226. PATENTED JAN. 27, 1903.
J. JOHNSON.
FISH CLEANING APPARATUS.
APPLICATION FILED MAY 13, 1901.
NO MODEL. 5 SHEETS—SHEET 4.
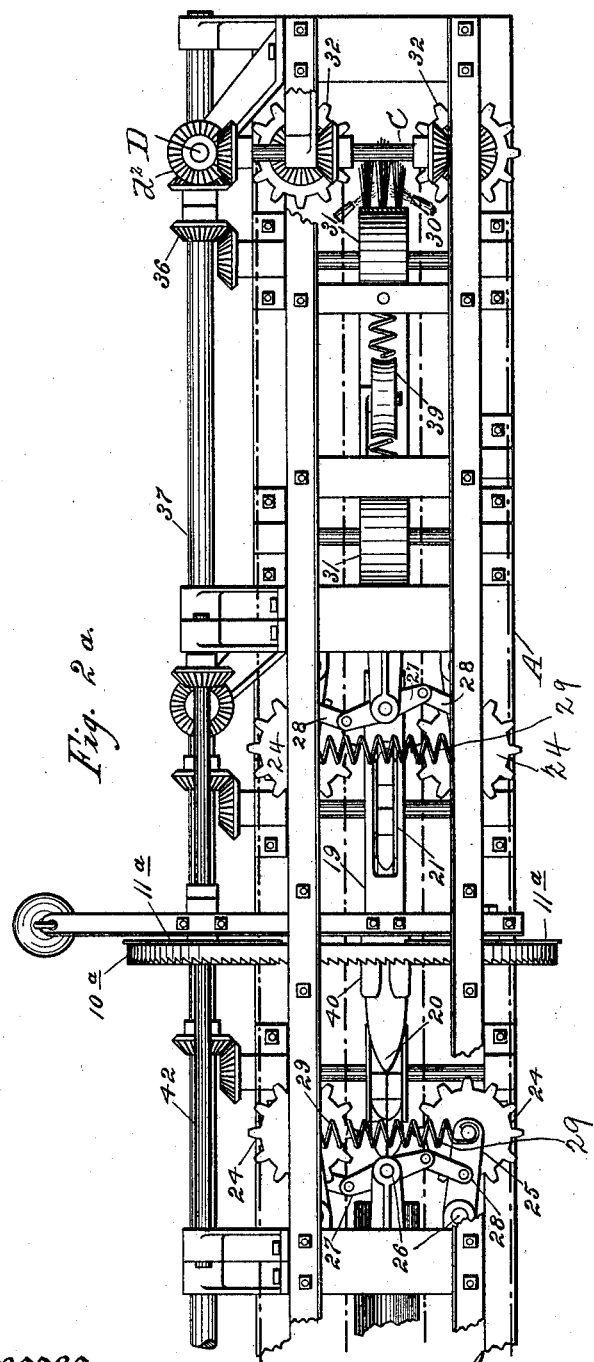
Witnesses, Inventor,
John Johnson No. 719,226. PATENTED JAN. 27, 1903.
J. JOHNSON.
FISH CLEANING APPARATUS.
APPLICATION FILED MAY 13, 1901.
NO MODEL. 5 SHEETS—SHEET 5.

Witnesses:
Inventor,
John Johnson

UNITED STATES PATENT OFFICE.

JOHN JOHNSON, OF SAN FRANCISCO, CALIFORNIA, ASSIGNOR TO ALASKA PACKERS ASSOCIATION, OF SAN FRANCISCO, CALIFORNIA, A CORPORATION OF CALIFORNIA.

FISH-CLEANING APPARATUS.

SPECIFICATION forming part of Letters Patent No. 719,226, dated January 27, 1903.

Application filed May 13, 1901. Serial No. 60,018. (No model.)

*To all whom it may concern:*

Be it known that I, JOHN JOHNSON, a citizen of the United States, residing in the city and county of San Francisco, State of California, have invented an Improvement in Fish-Cleaning Apparatus; and I hereby declare the following to be a full, clear, and exact description of the same.

My invention relates to an apparatus which is especially designed for the cleaning and dressing of fish, such as salmon, preparatory to packing into cans for preservation and shipment.

It consists in devices by which the fish is carried through an apparatus with suitable guides and separators, band-saws so located and driven with relation to the passing fish as to cut off the fins, devices for splitting, disemboweling, and cleaning out the interior of the fish successively.

It also comprises details of construction which will be more fully explained by reference to the accompanying drawings, in which—

Figure 1:
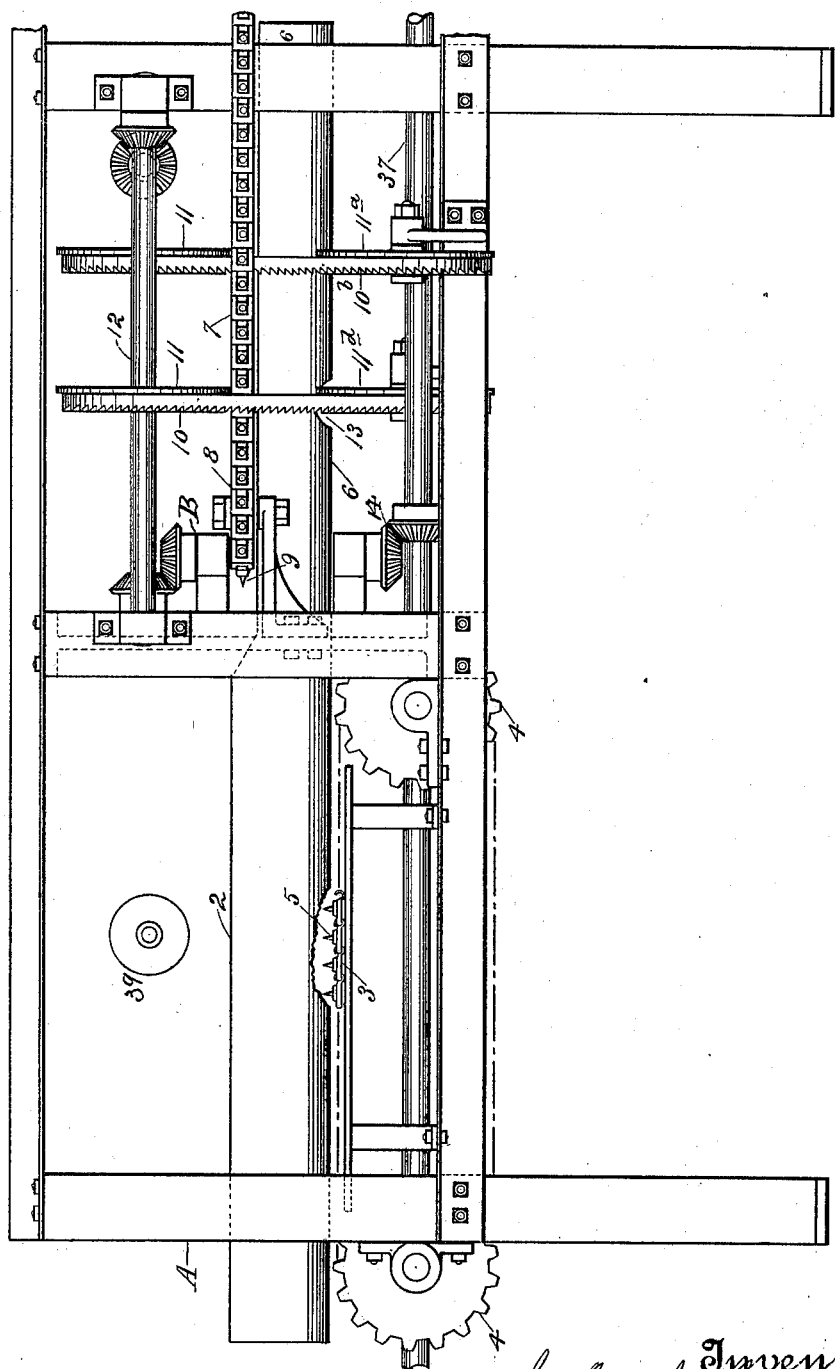
Figure 2:
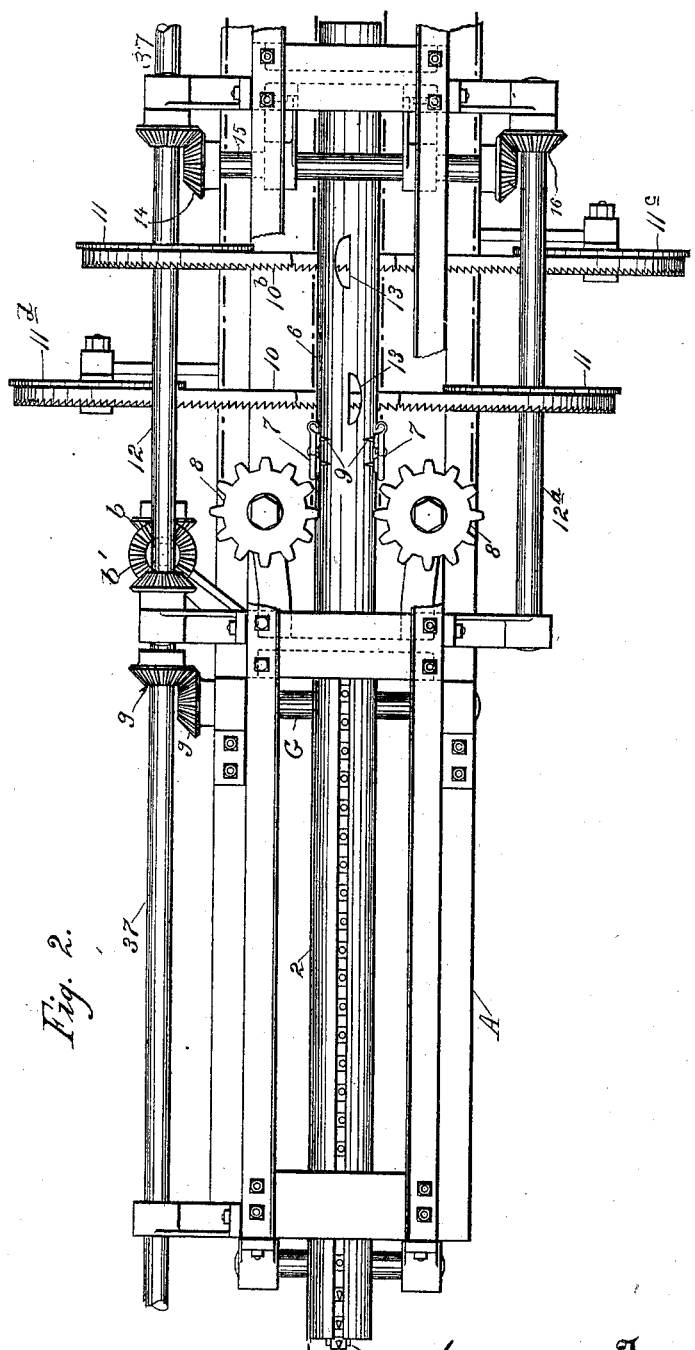
Figure 4:
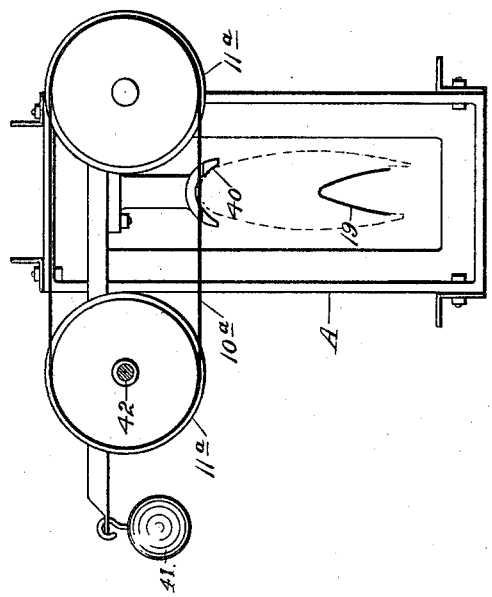
Figure 3:
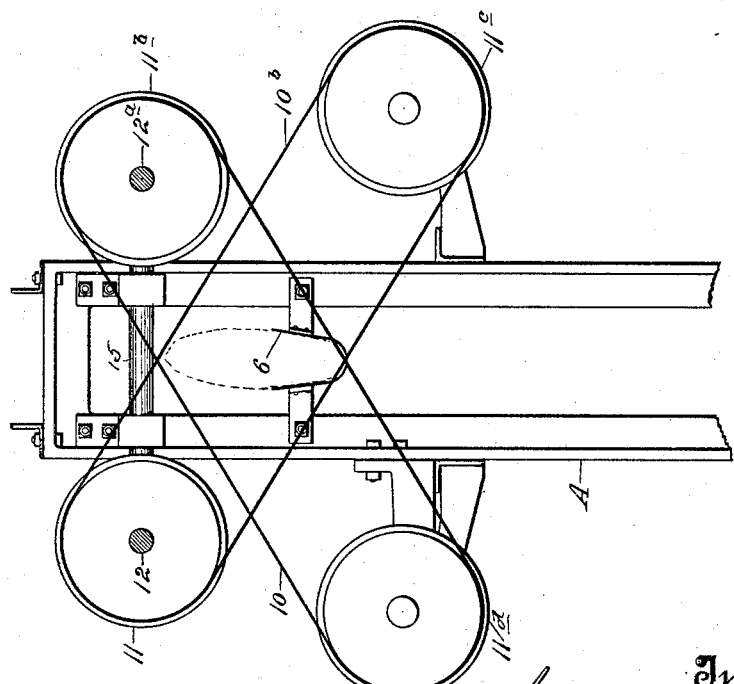

Figures 1 and 1ª, Sheets 1 and 2, show an elevation of the apparatus. Figs. 2 and 2ª, Sheets 3 and 4, show a plan view of the same. Fig. 3 is a view showing especially the diagonal fin-saws and the manner in which they are mounted. Fig. 4 is a view showing particularly the disposition of the horizontal fin-saw.

Various devices have been constructed for the disemboweling and cleaning of fish, in some of which the fish is passed through the apparatus lying upon the back, in others upon the side. My invention is especially designed to carry the fish through the apparatus with the belly downward and to so dispose the splitting cleaning mechanism and brushes with relation to the passing fish that the soft parts removed in the disemboweling process will be delivered downwardly and clear of all the mechanism, which is thus preserved from clogging, and I am able to avail myself of the force of gravitation in disposing of the waste material.

As herein illustrated, A is a suitable framework upon which the various parts of the apparatus are mounted.

I have in the present case shown no means for decapitating and cutting off the tail of the fish, this being no part of my present invention. The fish is therefore delivered to the present apparatus with these operations already completed. The fish is received into the apparatus with the belly downward and the back upward. The first part of the apparatus is a guide or chute 2, slotted and open at the bottom, and a chain 3, passing around the sprocket-wheels 4, so disposed that it moves through this open slot in the guide. The links of this chain carry points 5, which enter the belly of the fish and have sufficient holding power to transmit the fish through the first portion of the apparatus, above which one or more pressure-rollers 39 act in conjunction with the chain. In line with the guide 2 is a similar guide 6, into which the fish is delivered as it leaves the guide 2. The sides of the guides 6 are of such height that the upper portion of the fish projects above them, and as it leaves the guide 2 it passes between the horizontal traveling chains 7, these chains passing around sprocket-wheels, as at 8 and 32, and having upon their links the points 9, which are adapted to enter the sides of the fish, and thus move it through the guiding chute or trough 6 and the subsequent parts of the apparatus. In the drawings I have shown these chains in some figures only diagrammatically for the sake of clearness of other and more important features; but in other figures, and even in those cases where the chains are shown in diagrammatic form, I have illustrated certain of the links of the chains in full. These chains are so located that they stand opposite the solid upper and back portion of the fish, and thus insure a firm hold of the points to carry the fish through the various operations to which it is to be subjected.

The first operation consists in removing the fins, and this is effected by band-saws 10, which pass around driving-pulleys 11 and 11ᵇ, mounted upon shafts, as at 12 and 12ª. The lower portion of the guide 6 has cut-away openings or spaces, as at 13, and these are so located upon the lower part and upon opposite sides that as the fish passes the fins to be severed will be exposed through these openings. The pulleys over which the saws pass are mounted so that the saws travel at an inclination sufficient to cause them to pass through the openings 13 in a diagonal manner, and as the fish moves through the chute and the fins pass these openings and the saws which are traveling through them the fins will be cut off without removing too much of the flesh, as the body of the fish is protected from any action of the saws by the guide, and only the fins will be exposed through the openings as they pass.

The main power-shaft 37 is here shown journaled along one side near the bottom of the frame, and power to drive the various parts is transmitted from it as follows: A vertically-journaled shaft B is driven by bevel-gears $b$ and at the upper end transmits motion to the shaft 12 by similar gears $b'$, Fig. 2. This shaft 12 carries one of the fin-saw pulleys 11, and the other pulley $11^c$ of this pair is carried upon a shaft lower down upon the opposite side of the machine, as in Fig 3. A shaft 15, journaled horizontally across the upper part, receives motion from the shaft 12 through bevel-gears 14 and transmits motion to shaft $12^a$ through similar gears 16. From a pulley $11^b$ on this shaft the diagonally-disposed fin-saw 10 passes around the pulley $11^d$. The horizontally-traveling fin-saw $10^a$ is carried upon pulley $11^a$ and driven by the shaft 12 or other equivalent connection. A yielding guide 40 is located contiguous to the saw $10^a$, so that it holds the fish in proper position while passing this saw. Pressure may be applied to the guide by a weight 41 upon a lever which presses upon guide 40 or by equivalent spring. Power to drive the traveling carriers 7 and 18 is transmitted as follows: The driving-sprockets 32 of chain 7 and 33 of chains 18 are mounted upon vertically-journaled shafts F, the upper ends of which carry bevel-gears, which are engaged and driven by similar gears upon a horizontally-journaled shaft C. A vertical shaft D is journaled to intersect the shafts 37 and C, and by means of beveled gears upon these shafts motion is transmitted from 37 to the chain-sprocket shafts F. The chain-carrying sprocket 4, which propels the chain 3, is mounted upon a horizontal shaft G, journaled to intersect the main shaft 37, and motion is transmitted by means of beveled gears $g$ upon these shafts.

After passing the saws 10 and $10^b$ the belly of the fish is exposed to a revolving knife or cutter 17, mounted upon a horizontal shaft, and the cutter-blade projects into the path of travel of the lower part of the fish, and thus splits the belly open, exposing the intestinal cavity. At this point the fish will have left the exterior guide 6, through which it has until now been traveling, and as it passes over the cutter-blade it continues between the carrying-belts 7, but also passes between another pair of belts 18, which are located lower down—opposite the sides of the fish—and which serve, in conjunction with the upper belts 7, to steady the fish and prevent its being tilted to one side or the other. This insures the cut being made centrally into the intestinal cavity, and as the fish leaves the cutter it then passes over a plow-shaped form 19, which is made of such shape that the fish slips over this form, which thus acts as a support for the interior sides of the intestinal cavity. At the same time the point 20 of the plow acts to scoop out the greater portion of the intestines, which drop by gravitation directly below the machine and without contact with any other moving part of the apparatus, since the chains 7 and 18 are located above the plane of the opening in the abdominal cavity. The upper portion of the form 19 is cut away, as shown at 21, and below this cut-away portion is journaled a shaft 22, upon which are mounted the radial elastic arms or scrapers 23. These arms revolving through the opening 21 as the fish passes act to scrape out any portions of the intestines which may adhere to the sides of the cavity, which is temporarily exposed to the action of the scrapers as it passes over this cut-away portion. Yielding pressure-rollers hold the fish down against the cutter and the scrapers and brushes. The chains 7, between which the fish passes at this stage of the operation and by which it is maintained in its proper position, pass between sprocket-wheels 20 and 24, and chains 18 at this point pass around sprocket-wheels 20. These wheels are carried upon vertical shafts which are journaled in or carried by arms 25, which are pivoted, as at 26, so that the arms are turnable about these pivot-points. Intermediate between the arms is a centrally-pivoted arm or lever 27, the ends of which are connected by links 28 with the arms 25 at points between the fulcrums 26 and the chain-pulleys. A suitable spring or springs 29 act to normally draw the chain-pulleys 24 toward each other, and by reason of the lever 27, and links 28, the movement of both pulleys is simultaneous, and they will be normally drawn near enough to each other so that the chains will grasp the smallest fish which may pass between them. Whenever larger fish arrive, the pressure upon the chains and the pulleys 24 will separate the latter, the spring 29 yielding to allow such separation, and the lever-arm 27 and links 28 insure the equal movement of the pulleys and chains upon opposite sides of the fish, thus insuring the fish being held centrally with relation to the knives and brushes while the operation is going on.

After leaving the form 19 the fish still carried between the chains 7 and 18 is passed over an endless traveling brush 30. This brush is formed of wire or other suitable stiff bristles fixed to and projecting from a belt which passes around horizontally-journaled pulleys 31. These pulleys are sufficiently separated so as to give a considerable length to that portion of the brush which is passing through the interior of the fish, and the latter is thus thoroughly brushed and cleansed from end to end of the intestinal cavity and much more completely than could be done by circular brushes, which only operate upon a small portion of the cavity at one time. Another advantage of this construction is that the bristles of that part of the brush which is passing through the intestinal cavity are approximately parallel, as the belt to which they are fixed is essentially straight between the pulleys over which it passes, but as soon as the belt commences to curve around the pulleys the bristles are opened or separated, and the jets of water which are employed for cleaning and washing the fish and the brushes having free access to the separated bristles will continually wash out all the material which might otherwise remain to clog them. In this manner all parts of the brush are continually cleaned, so that when it returns around the rear pulley it will be in condition to clean the next fish, and so on.

The sprockets 32 and 33, around which the directing-chains finally pass, have their shafts 15' carried upon arms or brackets, (shown at 34.)

That portion of the brush-carrying belt between the pulleys 31 may be prevented from sagging and held up to its work by intermediate supporting-rollers 38. As here shown, the roller is journaled in a bell-crank lever fulcrumed at its angle, and a spring connected with said lever holds the roller yieldingly to its work.

Pressure rollers or belts, as at 39, are yieldingly mounted above the line of travel of the fish and serve to hold it down against the counter-pressure of the cutter and brushes and also to insure proper engagement with the carrying-chain 3, if found necessary.

The pulleys 31, which carry the belt-brush, are also driven by bevel-gears, as at 36; but it will be manifest that all the different parts of this mechanism may be driven from any suitable or convenient moving part from which power may be transmitted for the purpose. This being a matter of convenience and within the province of the mechanic, I do not desire to limit myself to the especial driving connections here shown and described.

Having thus described my invention, what I claim as new, and desire to secure by Letters Patent, is—

1. In a fish-cleaning apparatus, a guide or form into which the fish is received, belly downward, said guide or form having a slot made through the bottom, an endless traveling belt having points projecting therefrom and entering the slot so as to engage and advance the fish through the form, and a device operating from below and splitting the belly to permit the removal of the entrails.

2. In a fish-cleaning machine, a guiding-form slotted at the bottom, an endless traveling belt with points projecting into the slot to engage the lower part of the fish and advance it through the form, a second form and endless traveling belts upon opposite sides of the upper part of the fish, with points adapted to engage and advance the fish, and a splitting device operating from below the fish and opening the intestinal cavity to permit the detachment of the contents.

3. In a fish-cleaning apparatus, a form into which the fish is delivered belly downward, chains having projecting points and traveling upon opposite sides to engage the fish above the form, openings made through the lower part of the form and diagonally-traveling endless band-saws passing across said openings and adapted to remove the fins as the fish passes.

4. In a fish-cleaning apparatus, forms in line with each other, means for advancing the fish through the forms, consisting of an endless traveling belt with pointed teeth, a slot made through the lower part of the first form through which said teeth engage the lower part of the fish, a pair of endless traveling belts with pointed teeth movable in a horizontal plane above the second form and engaging the sides of the fish to advance it through the second form and maintain it in an upright position, and a splitting device operating upwardly to open the intestinal cavity and allow the entrails to drop out essentially by gravity.

5. In an apparatus for cleaning fish, the combination in an organized machine of forms through which the fish is passed, endless traveling chains by which it is advanced through the forms, one of said forms having a slotted bottom, and diagonally-arranged, endless band-saws operating through the slots in the bottom of the form and adapted to remove the fins.

6. In a fish-cleaning apparatus, forms through which the fish is guided with the belly downward, endless traveling chains by which it is advanced through said forms, parallel horizontally-traveling chains between which the fish passes from the form, one pair of said chains having upon it teeth to engage and advance the fish, and the other pair acting in unison to maintain it in its vertical position, and a cutter over which the fish is passed, and by which the intestinal cavity is centrally opened from below.

7. In an apparatus for cleaning fish, a vertically-revoluble cutter, means by which the fish is advanced, belly downward over the upper part of the cutter whereby the intestinal cavity is opened, said means consisting of a pair of horizontally-traveling chains upon opposite sides of the fish having points to engage and advance the same, another pair of chains or belts traveling parallel to the first and acting in unison therewith to maintain the fish in a vertical position, and an inverted-plow-shaped form over which the fish is passed from the cutter.

8. In an apparatus for cleaning fish, means for advancing the fish horizontally with the belly downward, a vertically-revoluble cutter over the upper part of which the fish is passed to open the intestinal cavity, an inverted plow and form over which the fish passes from the cutter to said plow capable of excavating the contents of the cavity and allowing said contents to drop out by gravitation, and yielding pressure devices above the passing fish.

9. In an apparatus for cleaning fish, a guide and carriers by which the fish is supported and advanced horizontally belly downward, a cutter standing on edge in the vertical central line of the fish and capable of splitting the fish in the direction of its length; and means comprising a scraper and an endless traveling, brush-armed belt for removing the contents from the intestinal cavity and allowing said contents to drop away from the machine by gravitation.

10. In an apparatus for cleaning fish, exterior guides and means for advancing the fish horizontally with the belly downward, a vertically-revoluble cutter over which the fish passes and by which the intestinal cavity is slit open, an inverted-plow-shaped form over which the fish passes, and by which the contents of the open cavity are excavated and caused to drop by gravitation, an opening formed in the top of said form and brushes or scrapers revoluble in a vertical plane within said opening whereby the cavity in the fish is cleaned as it passes the opening in the form.

11. In a fish-cleaning apparatus, horizontally-disposed guides by which the fish is held in a vertical position with the belly downward, means by which the fish is guided and advanced in this position, a vertically-revoluble cutter over the upper part of which the fish is passed to open the intestinal cavity, an inverted form fitting the interior of said cavity and over which the fish passes from the cutter, said form having a plow-shaped front adjacent to the cutter whereby the contents of the cavity are excavated and caused to fall by gravitation, an opening formed in the top of said form, radial scrapers or brushes revoluble in a vertical plane within said opening adapted to clean the interior of the cavity as the fish passes above them, and an endless traveling belt in line with the rotary cleaners, and having brushes projecting therefrom and means whereby the fish is advanced so that the cavity in the fish will pass over said brushes.

12. In an apparatus for cleaning fish, means for guiding and advancing the fish in a horizontal line with the belly downward, a vertical revoluble splitting-knife, an inverted plow and form fitting the interior of the open cavity, radial scrapers revoluble in a vertical plane, an opening in the top of the form through which said scrapers act to cleanse the interior of the fish, an endless traveling brush movable in line with the form and scrapers, and means for advancing the fish so that the cavity passes over that portion of the brush between the carrying-pulleys to finally cleanse the interior of the fish.

13. In an apparatus for cleaning fish, a vertically-revoluble cutter, an inverted plow and form over which the fish passes from the cutter, means for supporting and advancing the fish in its vertical position, consisting of belts having projecting points adapted to engage the upper part of the fish from the opposite sides, other plane-faced belts traveling in unison with the first named and pressing against the sides of the fish below, pulleys around which the chains pass, fulcrumed arms within which the vertical shafts of said pulleys are journaled, springs by which these pulleys are normally drawn toward each other to keep the belts in contact with the smaller fish, said springs yielding to allow larger fish to pass between the belts, and a pivoted lever and link connections with the pulley-carrying arms whereby they separate or approach in unison.

14. The combination in a fish-cleaning apparatus, of one or more forms adapted to receive the fish and maintain it in a vertical position, driving-belts with points adapted to engage and advance the fish through the form, the first of said belts acting vertically, and the second pair transversely upon opposite sides of the fish, and splitting means operating from below to open the intestinal cavity of the fish.

15. In a fish-dressing machine the combination of a carrier for the fish; a cutting mechanism for opening the cavity of the fish; and a combined inverted plow and form immediately following the cutter and over which the fish passes therefrom said plow fixed in relation to the carrier and made scoop-shaped whereby as the fish is advanced the contents are scooped out.

16. In a fish-cleaning apparatus the combination of a carrier; a splitting mechanism; an inverted plow and form over which the fish passes from the splitter, said plow having a scoop-shaped end to enter the cavity of the fish and remove the contents thereof; an endless traveling vertically-disposed elongated brush having its greatest length in the direction of travel of the fish; pulleys over which the brush passes and by which it is driven in a horizontal plane; mechanism by which the downwardly-presented open intestinal cavity of the fish is caused to traverse the upper run of the brush; and yielding pressure devices upon which the upper run of the brush is supported and held to its work.

17. In a fish-cleaning machine a guide within which the fish is supported belly downward said guide having a slot made through its bottom; a vertically-disposed cutter located below the fish and operating through the slotted bottom of the guide to split the belly of the fish; a spreader; and endless traveling spur-armed carriers engaging the sides of the fish to guide and advance the fish, said carriers being located above the line of discharge of the contents of the cavity.

18. In a fish-cleaning machine, a guide within which the fish is supported belly downward, said guide having a slot made through its bottom; a vertically-disposed rotary cutter operating through the slotted bottom of the guide and splitting the fish to open the intestinal cavity; a scoop-shaped member for excavating the contents; means for cleaning the cavity; and traveling spur-armed carriers located above the horizontal plane of the discharge and adapted to grasp opposite sides of the fish to advance it through the machine.

19. In a fish-cleaning-machine, guides within which the fish is supported and advanced with the belly downward; a vertical rotary cutter by which the fish is split lengthwise from below; an inverted plow and form over which the fish passes from the cutter; and an elongated endless traveling belt succeeding the form and drums around which the belt passes said belt having its bristles capable of separating when passing around the drum.

In witness whereof I have hereunto set my hand.

JOHN JOHNSON.

Witnesses:
S. H. NOURSE,
JESSIE C. BRODIE.